(12) United States Patent
Li

(10) Patent No.: US 12,395,868 B2
(45) Date of Patent: Aug. 19, 2025

(54) BEAM FAILURE DETERMINATION METHOD AND APPARATUS, DEVICE, AND STORAGE MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 428 days.

(21) Appl. No.: 18/004,587

(22) PCT Filed: Aug. 21, 2020

(86) PCT No.: PCT/CN2020/110593
§ 371 (c)(1),
(2) Date: Jan. 6, 2023

(87) PCT Pub. No.: WO2022/036709
PCT Pub. Date: Feb. 24, 2022

(65) Prior Publication Data
US 2023/0254712 A1    Aug. 10, 2023

(51) Int. Cl.
*H04W 24/04* (2009.01)
*H04L 5/00* (2006.01)
(Continued)

(52) U.S. Cl.
CPC ........... *H04W 24/04* (2013.01); *H04L 5/0048* (2013.01); *H04L 5/0053* (2013.01); *H04W 74/0833* (2013.01); *H04W 74/0836* (2024.01)

(58) Field of Classification Search
None
See application file for complete search history.

(56) References Cited

U.S. PATENT DOCUMENTS 12,095,609 B2*    9/2024   Lee ..................... H04B 7/0617
2019/0379506 A1* 12/2019  Cheng ................... H04W 88/06
(Continued)

FOREIGN PATENT DOCUMENTS

| CN | 110169116 A | 8/2019 |
|---|---|---|
| CN | 110505711 A | 11/2019 |

(Continued)

OTHER PUBLICATIONS

Notice of Reasons for Refusal for Japanese Application No. 2022-581684, issued on Oct. 31, 2023.
(Continued)

*Primary Examiner* — Faiyazkhan Ghafoerkhan
(74) *Attorney, Agent, or Firm* — Finnegan, Henderson, Farabow, Garrett & Dunner, L.L.P.

(57) ABSTRACT

A beam failure determination method includes: determining N reference signal resource sets for beam failure detection, and transmission/reception point (TRP) identifiers corresponding to the respective reference signal resource sets, wherein at least two different reference signal resource sets are included in the N reference signal resource sets, TRP identifiers corresponding to the at least two different reference signal resource sets are different from each other, and physical cell identifiers corresponding to the at least two different reference signal resource sets are the same.

20 Claims, 5 Drawing Sheets

(51) Int. Cl.
*H04W 74/0833* (2024.01)
*H04W 74/0836* (2024.01)

(56) References Cited

U.S. PATENT DOCUMENTS

| | | | | |
|---|---|---|---|---|
| 2021/0344558 A1* | 11/2021 | Lee | ........................ | H04L 5/0025 |
| 2023/0216565 A1* | 7/2023 | Kwak | .................. | H04B 7/0695 375/267 |
| 2023/0254712 A1* | 8/2023 | Li | ......................... | H04L 5/0053 370/216 |
| 2024/0098541 A1* | 3/2024 | Matsumura | ........... | H04W 24/10 |
| 2024/0138017 A1* | 4/2024 | Li | ........................ | H04B 7/0695 |

FOREIGN PATENT DOCUMENTS

| | | |
|---|---|---|
| CN | 111278122 A | 6/2020 |
| WO | WO 2020010630 A1 | 1/2020 |
| WO | WO 2020012619 A1 | 1/2020 |

OTHER PUBLICATIONS

Examination Report for India Application No. 202347006422, issued on Sep. 25, 2023, 6 pages.

Convida Wireless, "On Beam Failure Recovery for SCell", 3GPP TSG-RAN WG1 #98bis, R1-1911006, Chongqing, China, Oct. 14-20, 2019, 8 pages.

Extended European Search Report issued in Application No. 20949917.7 dated Apr. 3, 2024, 11 pages.

International Search Report and Written Opinion of International Application No. PCT/CN2020/110593, mailed May 19, 2021, 16 pages.

Office Action issued by the Indonesian Patent Office on Feb. 28, 2025, in corresponding Application No. P0020301010, 6 pages.

Notice of the first review opinion issued by the Korean Patent Office on Feb. 13, 2025, in corresponding Application No. KR 10-2023-7001024, 19 pages.

"Beam failure recovery", Huawei, HiSilicon, 3GPP TSG RAN WG1 Meeting #89, R1-1708135, Hangzhou, China, May 15-19, 2017, 9 pages.

"Enhancements on multi-beam operations", MediaTek Inc., 3GPP TSG RAN WG1 #98, R1-1908380, Prague, CZ, Aug. 26-30, 2019, 13 pages.

"FL summary for Multi-TRP/Panel Transmission", Moderator (Oppo), 3GPP TSG RAN WG1 #100bis, R1-2002406, e-Meeting, Apr. 20-30, 2020, 34 pages.

* cited by examiner

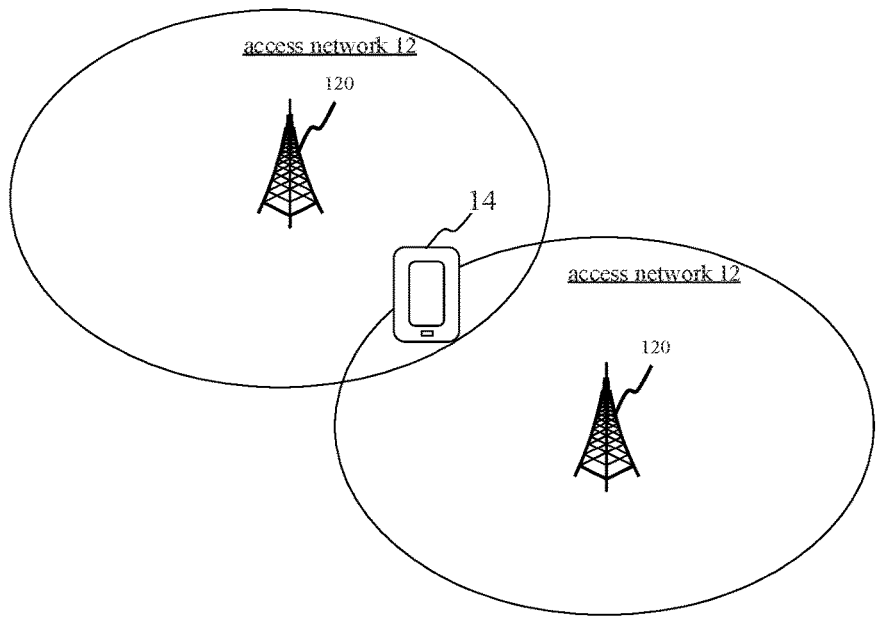
FIG. 3
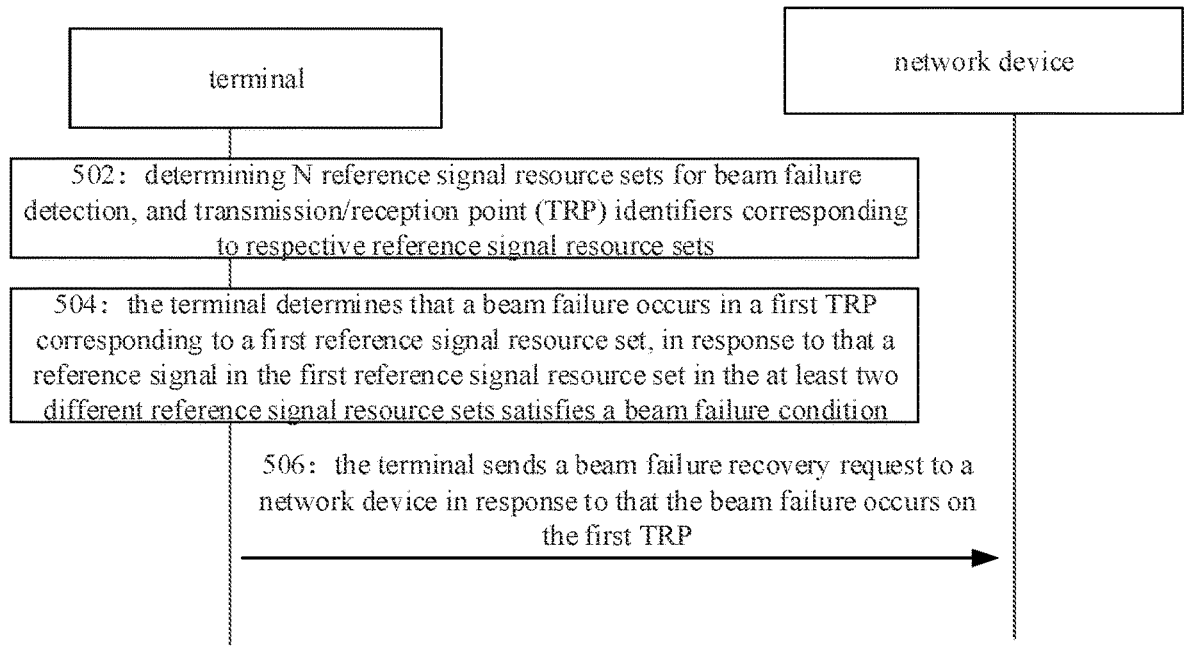
FIG. 4
FIG. 5

BEAM FAILURE DETERMINATION METHOD AND APPARATUS, DEVICE, AND STORAGE MEDIUM

CROSS-REFERENCE TO RELATED APPLICATION

This application is the US national phase application of International Application No. PCT/CN2020/110593, filed on Aug. 21, 2020, the entire contents of which are incorporated herein by reference.

TECHNICAL FIELD

The present disclosure relates to the technical field of mobile communication, and in particular, to a method for determining beam failure, an apparatus for determining beam failure, a terminal, and a medium.

BACKGROUND

In a new radio (NR) system, particularly when a communication band is in band range 2, due to the fast attenuation of high frequency channel, beam-based transmission and reception is required to ensure the coverage.

In the NR system, a control channel also needs to use beam-based transmission and reception. When a user equipment (UE) moves or an antenna direction rotates, a problem may occur in a receiving beam or a sending beam currently configured to the UE for sending and receiving a physical downlink control channel (PDCCH), namely, a problem of beam failure occurs. A current communication protocol defines a reference signal resource set q0 for detecting beam failure. A beam failure occurs when the UE detects that the radio link quality of all reference signals in the reference signal resource set is lower than a threshold #1. At this time, the UE will, according to a reference signal resource set q1 for determining candidate beam configured by a base station, detect whether there is a reference signal in the reference signal resource set, whose reference signal received power (RSRP) meets a threshold #2. If yes, the UE may also notify the base station of a new candidate beam while notifying a beam failure, for the base station to configure a new beam for the terminal.

SUMMARY

Embodiments of the present disclosure provide a method for determining beam failure, an apparatus for determining beam failure, a terminal, and a medium, based on which, in a scenario of multiple TRPs, a network device can recover from a beam failure on a single TRP. The technical solutions are as follows.

According to an aspect of the present disclosure, there is provided a method for determining beam failure, which is applied to a terminal. The method includes:

determining N reference signal resource sets for beam failure detection, and transmission/reception point (TRP) identifiers corresponding to respective reference signal resource sets, in which at least two different reference signal resource sets are included in the N reference signal resource sets, TRP identifiers corresponding to the at least two different reference signal resource sets are different, and physical cell identifiers corresponding to the at least two different reference signal resource sets are the same.

According to another aspect of the present disclosure, there is provided a method for determining beam failure, which is applied to a network device. The method includes:

sending configuration information, in which the configuration information configures a terminal with at least one reference signal resource set in N reference signal resource sets for beam failure detection, and a transmission/reception point (TRP) identifier corresponding to each reference signal resource set in the at least one reference resource set;

in which at least two different reference signal resource sets are included in the N reference signal resource sets, TRP identifiers corresponding to the at least two different reference signal resource sets are different, and physical cell identifiers corresponding to the at least two different reference signal resource sets are the same.

According to another aspect of the present disclosure, there is provided a terminal. The terminal includes:

a processor;
a transceiver connected to the processor; and
a memory for storing executable instructions of the processor;
in which the processor is configured to load and execute the executable instructions to implement the above-mentioned method for determining beam failure.

According to another aspect of the present disclosure, there is provided a network device. The network device includes:

a processor;
a transceiver connected to the processor; and
a memory for storing executable instructions of the processor;
in which the processor is configured to load and execute the executable instructions to implement the above-mentioned method for determining beam failure.

BRIEF DESCRIPTION OF THE DRAWINGS

The accompanying drawings used in the description of the embodiments will be briefly introduced below, and it is obvious that the accompanying drawings in the following description are only used to illustrate example embodiments of the present disclosure. For those skilled in the art, other embodiments can also be obtained.

FIG. 3 is a schematic diagram showing a communication system provided in an embodiment of the present disclosure.

FIG. 4 is a flow chart showing a method fix determining beam failure provided in an embodiment of the present disclosure.

FIG. 5 is a flow chart showing a method for determining beam failure provided in an embodiment of the present disclosure.

DETAILED DESCRIPTION

In order to make the objectives, technical solutions and advantages of the present disclosure clearer, embodiments of the present disclosure will be further described in detail below with reference to the accompanying drawings.

In all the following embodiments of the present disclosure, although different steps are numbered by numbers, these numbers are only for the purpose of making words clearer, and are not the limitation of the execution order and time slot of the steps. In various embodiments of the present disclosure, these numbered steps can be implemented individually or in any combination. When these steps are implemented in any combination, the execution order is not limited by the numbered numbers, that is, they can be performed in any order.

Firstly, several technical terms related to present disclosure are briefly described as follows.

Random Access Procedure

The random access procedure refers to a process from the time when a terminal device sends a preamble to attempt to access a network to the time when it establishes a basic signaling connection with the network. The random access procedure is one of the most basic requirements for any cellular communication system to enable the terminal device to establish data communication with the network side.

The random access procedure is divided into four-step (4-step) random access and two-step (2-step) random access.

Four-Step Random Access

Figure 1:
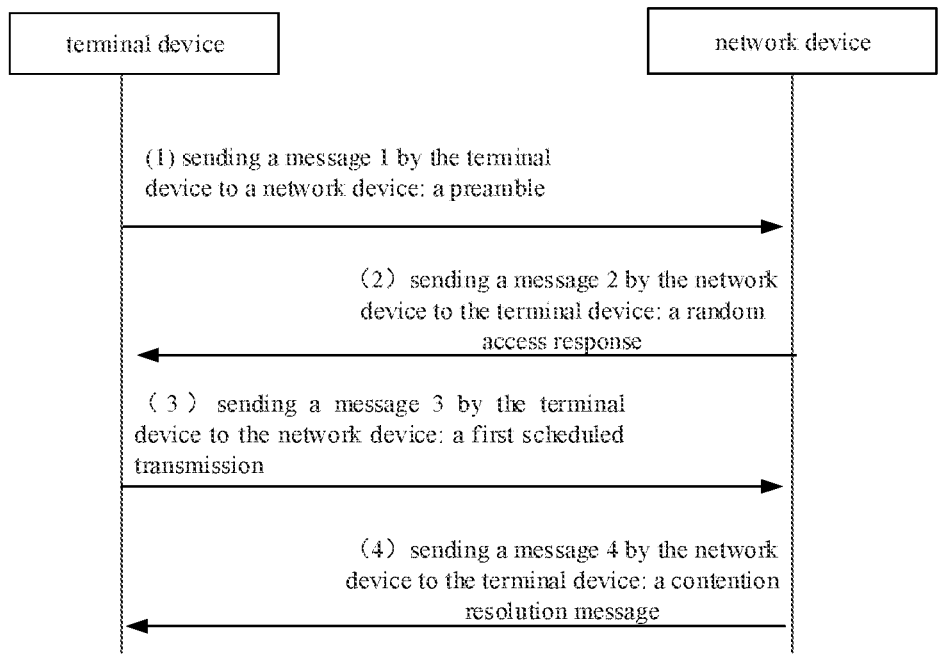
FIG. 1 is a schematic diagram showing a four-step random access procedure provided in an embodiment of the present disclosure.

FIG. 1 shows four steps of the random access procedure in a contention-based random access procedure, which include as follows.

(1) A message 1 (i.e., a preamble) is sent by the terminal device to a network device.

The preamble is sent by the terminal device to the network device, and the network device estimates a transmission delay of the terminal device accordingly, to realize uplink synchronization.

(2) A message 2 (i.e., a random access response (RAR)) is sent by the network device to the terminal device.

The network device sends a timing advance command based on the transmission delay estimated in the above step (1), to adjust the sending time of the terminal device. The message 2 is organized by a media access control (MAC) layer of the network device, and is included by a downlink shared channel (DL_SCH).

The network device uses a physical downlink control channel (PDCCH) to schedule the message 2, and addresses (also referred to scramble) it by a C-RNTI or a RA-RNTI. The RA-RNTI is determined by a time-frequency resource position of physical random access channel (PRACH) including the message 1. The message 2 contains an uplink transmission timing advance, for allocating uplink resources and a temporary C-RNTI for a message 3.

(3) A message 3 (i.e., a first scheduled transmission) is sent by the terminal device to the network device.

The terminal device transmits the message 3 on the allocated uplink resources after receiving the message 2, and sends a user equipment identity (UE ID) to the network device through a physical uplink shared channel (PUSCH).

(4) A message 4 (i.e., a contention resolution message) is sent by the network device to the terminal device.

The contention resolution message is sent by the network device to the terminal device on a physical downlink share channel (PDSCH).

Two-Step Random Access

Figure 2:
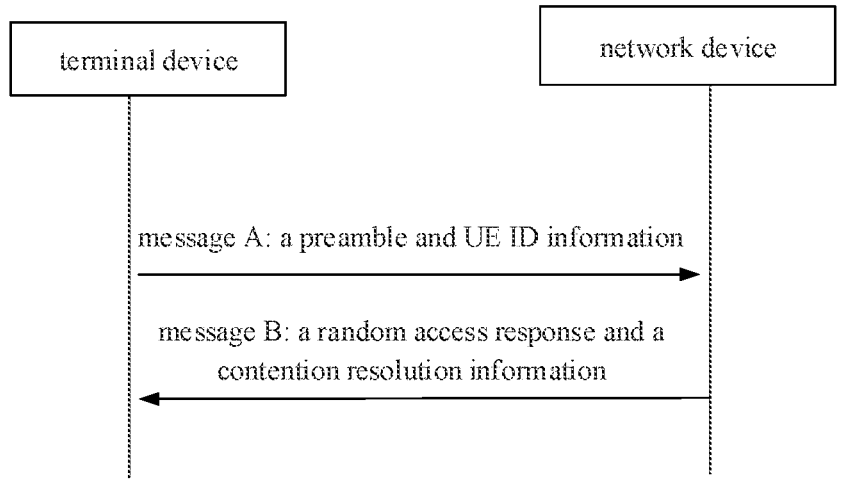
FIG. 2 is a schematic diagram showing a two-step random access procedure provided in an embodiment of the present disclosure.

The 4-step random access procedure can be merged into a 2-step random access procedure in the contention-based random access procedure. Combined with FIG. 2, the merged process includes a message A and a message B. The related steps include as follows.

(1) The terminal device sends the message A to the network device.

(2) The network device sends the message B to the terminal device after receiving the message A sent by the terminal device.

Optionally, the message A includes contents of the message 1 and the message 3. That is, the message A includes a preamble and a UE ID. The UE ID may be one of a cell radio network temporary identifier (C-RNTI), a temporary C-RNTI, a random access radio network temporary identifier (RA-RNTI), and a non-access stratum UE ID.

Optionally, the message B includes contents of the message 2 and the message 4. That is, the message B includes a random access response and a contention resolution message.

FIG. 3 shows a block diagram showing a communication system provided in an embodiment of the present disclosure. The communication system may include an access network 12 and a terminal device 14.

The access network 12 includes several network devices 120. The network device 120 may be a base station, which is an apparatus deployed in the access network to provide a wireless communication function for the terminal device. The base station may include various forms of a macro base station, a micro base station, a relay station, an access point, etc. In systems with different wireless access technologies, the names of devices with base station functions may be different. For example, in LTE systems, they are referred to as eNodeBs or eNBs. In 5G NR systems, they are referred to as gNodeBs or gNBs. With the evolution of communication technology, the description of "base station" may change. For ease of description in the embodiments of the present disclosure, the above-mentioned apparatuses for providing the wireless communication function for the terminal device 14 are collectively referred to as network devices. In vehicle networking communication, the network device may also be a vehicle-mounted terminal device.

The terminal device 14 may include various handheld devices, vehicle-mounted devices, wearable devices, computing devices, Internet of Things (IoT) devices or Industry Internet of Things (IIoT) devices, or other processing devices connected to wireless modems with wireless communication functions, and various forms of user equipment, mobile stations (MSs), terminal devices, etc. For the convenience of description, the above-mentioned devices are collectively referred to as terminal devices. The network device 120 and the terminal device 14 communicate with each other through a certain radio technology, such as a Uu interface.

The technical solutions of the embodiments of the present disclosure can be applied to various communication systems, for example, a frequency division duplex (FDD) system, a time division duplex (TDD) system, an advanced long term evolution (LTE-A) system, a new radio (NR) system, an evolution system of the NR system, a LTE-based access to unlicensed spectrum (LTE-U) system, a NR-U system, a universal mobile telecommunication system (UMTS), a worldwide interoperability for microwave access (WiMAX) communication system, a wireless local area Networks network (WLAN), a wireless fidelity (WiFi), a next-generation communication system or other communication systems, etc.

Generally speaking, a number of connections supported by traditional communication systems is limited and are easy to implement. However, with the development of communication technology, mobile communication systems will not only support traditional communication, but also support, for example, device to device (D2D) communication, machine to machine (M2M) communication, machine type communication (MTC), vehicle to vehicle (V2V) communication and vehicle to everything (V2X) systems, etc. The embodiments of the present disclosure can also be applied to these communication systems.

At most one q0 and one q1 are configured on each bandwidth part (BWP) of each serving cell of the terminal including a primary cell (Pcell), a primary secondary cell (PScell), and a secondary cell (SCell), in which q0 is a reference signal resource set used for beam failure detection, and q1 is a reference signal resource set used for candidate beam discovery. Even in the case where the terminal is configured with multiple TRPs to send PDCCHs on the activated BWP of one serving cell, only one q0 and one q1 are configured for the serving cell. Then there is a technical problem that multiple TRPs of the serving cell are not distinguished due to both q0 and q1 are configured for the serving cell. But in fact, when the terminal is configured to monitor the PDCCHs of multiple TRPs in the serving cell, it is possible that the PDCCH of a TRP1 has a beam failure, while a beam link of a TRP2 is normal. Since the base station does not know beam situation at the UE side, it will continue to use the TRP1 and the TRP2 to send the PDCCHs to the terminal. If contents of the PDCCHs sent by the TRP1 and the TRP2 are the same, that is, the TRP1 aims to repeatedly send the PDCCH sent by the TRP2, a beam failure occurs on the TRP1 will affect the reliability of the PDCCH transmission. If the PDCCH sent by the TRP1 is only for scheduling a PDSCH or a PUSCH on the TRP1, the beam failure of the TRP1 will cause the waste of PDCCH resources and PDSCH/PUSCH resources, and increase the power consumption of terminal for monitoring PDCCH unnecessarily.

FIG. 4 is a flow chart showing a method for determining beam failure provided in an embodiment of the present disclosure. The method is applied to a terminal as shown in FIG. 1 for illustration. The method includes step 402.

In step 402, N reference signal resource sets for beam failure detection, and transmission/reception point (TRP) identifiers corresponding to respective reference signal resource sets are determined.

At least two different reference signal resource sets are included in the N reference signal resource sets, TRP identifiers corresponding to the at least two different reference signal resource sets are different, and physical cell identifiers corresponding to the at least two different reference signal resource sets are the same.

For example, there are a reference signal resource set 1 corresponding to TRP1, and a reference signal resource set 2 corresponding to TRP2. The TRP1 and the TRP2 are two different TRPs, and both the TRP1 and the TRP2 correspond to a same serving cell 1.

A correspondence between the N reference signal resource sets and N TRP identifiers may be as any one of following four ways.

The TRP identifier includes a CORESET pool index, and the CORESET pool index is in one-to-one correspondence to the TRP.

The TRP identifier includes a reference signal resource set index, and the reference signal resource set index is in one-to-one correspondence to the TRP.

The TRP identifier includes at least one reference signal resource index, and the reference signal resource index is in one-to-one correspondence to the TRP.

The TRP identifier includes a TRP number.

For example, the physical cell identifier includes a physical cell identifier of a serving cell and/or a neighboring cell of the terminal.

For example, the reference signal resource includes at least one of: a synchronization signal block (SSB), a channel-state information reference signal (CSI-RS), a positioning reference signal (PRS), a tracking reference signal (TRS) and a sounding reference signal (SRS).

To sum up, in the method provided in the embodiment, by setting at least two reference signal resource sets for a terminal, in which the TRP identifiers corresponding to the at least two different reference signal resource sets are different, and the physical cell identifiers corresponding to the at least two different reference signal resource sets are the same, when a beam failure occurs on one TRP of multiple TRPs on the same service cell, the terminal can accurately determine of the TRP on which the beam failure event occurs and then accurately report the beam failure determination to the base station, to avoid waste of communication resources.

In an optional embodiment based on FIG. 4, the above-mentioned step 402 may be implemented in at least one of following three ways.

1. The network device sends first configuration information to the terminal, in which the first configuration information is configured to configure the N reference signal resource sets and the TRP identifiers corresponding to the N reference signal resource sets. The terminal receives the first configuration information from the network device, and determines the N reference signal resource sets for beam failure detection according to the first configuration information. Table 1 schematically presents the N reference signal resource sets.

TABLE 1

| Set | TRP |
|---|---|
| Reference Signal Resource Set 1 | TRP ID 1 |
| Reference Signal Resource Set 2 | TRP ID 2 |

2. The terminal determines default N reference signal resource sets and the TRP identifiers corresponding to the N reference signal resource sets.

For each one of the N TRPs, a default reference signal resource set is a reference signal resource set corresponding to a target transmission configuration indication (TCI) state, and the target TCI state is a TCI state configured for the terminal to monitor the PDCCH on the CORESET corresponding to the TRP.

For example, for the TRP1, a default reference signal resource set corresponding to the TRP1 includes reference signal resources corresponding to a TCI state 1, which is a TCI state configured for the terminal to monitor the PDCCH on the CORESET corresponding to the TRP1. For another example, for the TRP2, a default reference signal resource set corresponding to the TRP2 includes reference signal resources corresponding to a TCI state 2, which is a TCI state configured for the terminal to monitor the PDCCH on the CORESET corresponding to the TRP2. Table 2 schematically presents the N reference signal resource sets.

TABLE 2

| Set | TCI State | TRP |
| --- | --- | --- |
| Reference Signal Resource Set 0 | TCI State 0 | TRP ID 1 |
| Reference Signal Resource Set 1 | TCI State 1 | TRP ID 2 |
| Reference Signal Resource Set 5 | TCI State 5 | TRP ID 3 |

It can be understood that each element in Table 2 exists independently. These elements are illustratively listed in the same table, but it does not mean that all elements in the Table 2 must exist simultaneously as shown in the Table 2. A value of each of these elements is independent of a value of any other element in Table 2. Therefore, those skilled in the art can understand that the value of each element in Table 2 is an independent embodiment.

3. The network device sends second configuration information to the terminal, in which the second configuration information is configured to configure a first part of reference signal resource sets in the N reference signal resource sets, and a TRP identifier corresponding to the first part of the reference signal resource sets. The terminal receives the second configuration information from the network device, and determines the first part of the reference signal resource sets according to the second configuration information. In addition, the terminal also determines a default second part of reference signal resource sets, in which the second part of the reference signal resource sets includes remaining sets of the N reference signal resource sets other than the first part of reference signal resource sets.

FIG. 5 shows a flow chart showing a method for determining beam failure provided in an embodiment of the present disclosure. The method is applied to a terminal as shown in FIG. 1 for illustration. The method includes step 502, step 504, and step 506.

In step 502, the terminal determines N reference signal resource sets for beam failure detection, and transmission/reception point (TRP) identifiers corresponding to respective reference signal resource sets.

At least two different reference signal resource sets are included in the N reference signal resource sets, TRP identifiers corresponding to the at least two different reference signal resource sets are different, and physical cell identifiers corresponding to the at least two different reference signal resource sets are the same.

For example, a reference signal resource set 1 corresponds to TRP1, and a reference signal resource set 2 corresponds to TRP2. The TRP1 and the TRP2 are two different TRPs, and both the TRP1 and the TRP2 correspond to a same serving cell 1.

A correspondence between the N reference signal resource sets and N TRP identifiers may be as any one of following four ways:

The TRP identifier includes a CORESET pool index, and the CORESET pool index is in one-to-one correspondence to the TRP.

The TRP identifier includes a reference signal resource set index, and the reference signal resource set index is in one-to-one correspondence to the TRP.

The TRP identifier includes at least one reference signal resource index, and the reference signal resource index is in one-to-one correspondence to the TRP.

The TRP identifier includes a TRP number.

In step 504, the terminal determines that a beam failure occurs on a first TRP corresponding to a first reference signal resource set, in response to that at least one reference signal in the first reference signal resource set in the at least two different reference signal resource sets satisfies a beam failure condition.

For example, the beam failure condition includes that a radio link quality of a reference signal is lower than a threshold.

Optionally, the radio link quality of the reference signal is represented by a L1-reference signal received power (RSRP). Optionally, the radio link quality of the reference signal is represented by a L1-Signal-to-Interference-and-Noise Ratio (SINR).

In step 506, the terminal sends a beam failure recovery request to the network device in response to that beam failure occurs on the first TRP.

The beam failure recovery request is configured to indicate that the first TRP has a beam failure, or is configured to indicate that there is a TRP that has a beam failure but does not indicate which TRP has a beam failure, and then indicate which TRP has a beam failure in subsequent signaling.

To sum up, in the method provided by the embodiment, the terminal sends the beam failure recovery request to the network device in response to that the beam failure occurs on the first TRP, so that the terminal can accurately send the beam failure recovery request to the network device in response to that a beam failure occurs on a certain TRP in a scenario of multiple TRPs.

In an optional embodiment based on FIG. 5, there are two sending modes in step 506.

Mode one, the beam failure recovery request is sent by random access time-frequency resource, as shown in the embodiment shown in FIG. 6 below.

Mode two, the beam failure recovery request is sent by a SR included on a physical uplink control channel (PUCCH), as shown in the embodiment shown in FIG. 7 below.

Figure 6:
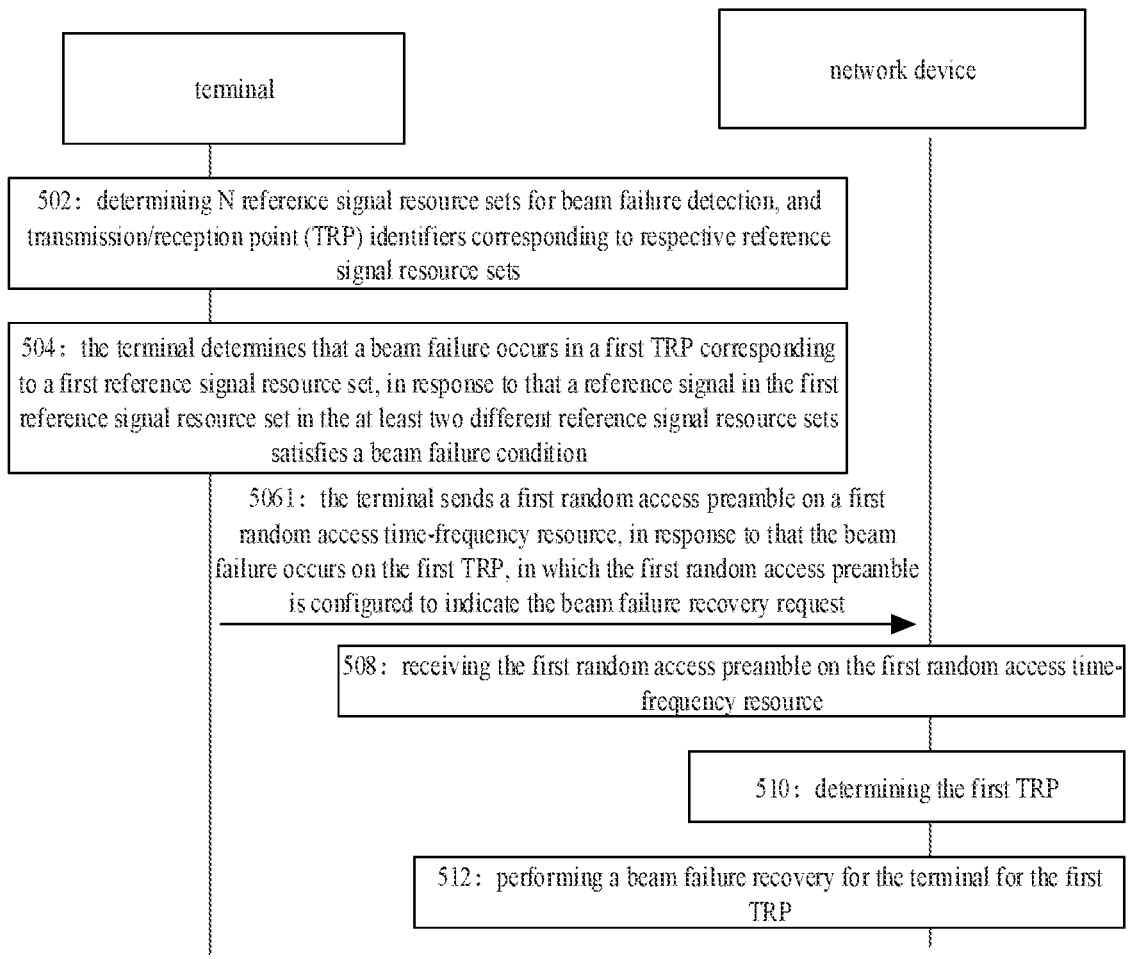
FIG. 6 is a flow chart showing a method for determining beam failure provided in an embodiment of the present disclosure.

The first sending mode for the beam failure recovery request (random access time-frequency resource):

FIG. 6 shows a flow chart showing a method for determining beam failure provided in an embodiment of the present disclosure. The method is applied to a terminal and a network device shown in FIG. 1 for illustration. The method includes the following steps.

In step 502, the terminal determines N reference signal resource sets for beam failure detection, and transmission/reception point (TRP) identifiers corresponding to respective reference signal resource sets.

At least two different reference signal resource sets are included in the N reference signal resource sets, TRP identifiers corresponding to the at least two different reference signal resource sets are different, and physical cell identifiers corresponding to the at least two different reference signal resource sets are the same.

In step 504, the terminal determines that a beam failure occurs on a first TRP corresponding to a first reference signal resource set, in response to that at least one reference signal in the first reference signal resource set in the at least two different reference signal resource sets satisfies a beam failure condition.

In step 506-1, the terminal sends a first random access preamble on a first random access time-frequency resource, in response to that the beam failure occurs on the first TRP, in which the first random access preamble is configured to indicate the beam failure recovery request.

In the above-mentioned embodiment, the step 506-1 is a method for sending the first random access preamble in response to the beam failure provided by the embodiment of the present disclosure. The step 506-1 may be performed alone, or in combination with any one of steps in the present disclosure.

The beam failure recovery request is configured to indicate that the first TRP has a beam failure, or to indicate that there is a TRP that has a beam failure, but does not indicate which TRP has a beam failure, and further indicate which TRP has a beam failure in subsequent signaling. The first random access preamble is a preamble allocated to indicate the beam failure recovery request among a plurality of random access preambles.

This step includes, but is not limited to at least one of following implementations.

The first random access preamble is sent on the first random access time-frequency resource, in response to that the beam failure occurs on the first TRP and the first TRP is a TRP on a primary cell (PCell).

The first random access preamble is sent on the first random access time-frequency resource, in response to that the beam failure occurs on the first TRP and the first TRP is a TRP on a primary secondary cell (PScell).

The first random access time-frequency resource is used to send the beam failure recovery request in response to that the TRP in which the beam failure occurs is a TRP on the PCell or the PScell, and a beam failure occurs on any TRP belonging to the PCell or PScell.

The first random access preamble is sent on the first random access time-frequency resource, in response to that the beam failure occurs on the first TRP and the first TRP is a TRP configured with CORESET #0 of the terminal in a primary cell (PCell).

The first random access preamble is sent on the first random access time-frequency resource, in response to that the beam failure occurs on the first TRP and the first TRP is a TRP configured with CORESET #0 of the terminal in a primary secondary cell (PScell).

It is to be noted that configured with CORESET #0 of the terminal indicates that the terminal receives indication information of CORESET #0 from the first TRP before the beam failure occurs on the first TRP.

For the first random time-frequency resource:

For example, the above-mentioned first random access time-frequency resource may be a random access time-frequency resource corresponding to the first TRP, or may be a random access time-frequency resource corresponding to the second TRP. The random access time-frequency resource may be abbreviated as a random access resource.

For the case where the first random time-frequency resource is the random access time-frequency resource corresponding to the first TRP itself:

The first random access time-frequency resource is a random access time-frequency resource corresponding to a first synchronization signal block (SSB) sent by the first TRP. The terminal may determine the first random access time-frequency resource as follows.

1. The first SSB is a reference signal resource corresponding to a TCI state of at least one CORESET corresponding to a CORESET pool index corresponding to the first TRP, and the random access time-frequency resource of the first SSB is determined as the first random access time-frequency resource. That is, the first SSB is the reference signal resource corresponding to the TCI state of at least one CORESET corresponding to the CORESET pool index corresponding to the first TRP.

2. A first channel state information reference signal (CSI-RS) is a reference signal resource corresponding to a TCI state of at least one CORESET corresponding to a CORESET pool index corresponding to the first TRP, and the first SSB corresponds to the first CSI-RS, and the random access time-frequency resource of the first SSB is determined as the first random access time-frequency resource. That is, the first CSI-RS is the reference signal resource corresponding to the TCI state of at least one CORESET corresponding to the CORESET index identifier corresponding to the first TRP.

3. The network device directly indicates the first SSB corresponding to the first TRP, or directly indicates the first SSB corresponding to the CORESET pool index corresponding to the first TRP.

For the case where the first random time-frequency resource is the random access time-frequency resource corresponding to other TRP:

The first random access time-frequency resource is a random access time-frequency resource corresponding to a second SSB, and the second SSB is an SSB sent by the TRP configured with the CORESET #0 of the terminal. The TRP configured with the CORESET #0 of the terminal may be the same as or different from the first TRP. For example, its own random access resources are preferentially used in response to that the beam failure occurs on the first TRP configured with the CORESET #0.

At this time, the method further includes:

sending identification information in a physical uplink shared channel (PUSCH) of message A in a two-step random access procedure, in which the identification information is configured to indicate an identifier of the first TRP; or, sending the identification information in the PUSCH of message 3 in a four-step random access procedure.

That is, the terminal notifies the network device that the beam failure occurs through the first random access preamble in the message A or the message 1, and also notifies the network device that the TRP on which the beam failure occurs is the first TRP through the message A or the message 3.

For example, the identification information includes at least one of:

a CORESET index identifier corresponding to the first TRP;

a reference signal resource set index or at least one reference signal resource index corresponding to the first TRP;

an identifier of the first TRP;

a cell identifier of the first TRP.

For example, the reference signal resources include at least one of: a SSB, a CSI-RS, a PRS, a TRS, and a SRS.

For example, the first TRP includes one or more TRPs, and identification of each TRP of the first TRP needs to be indicated in response to that the first TRP includes multiple TRPs. The multiple TRPs may belong to different cells, or to the same cell. When multiple TRPs belong to the same cell, if the cell has TRPs that have no beam failure, identification information of the multiple TRPs that have beam failure will be indicated. The identification information of multiple TRPs that have beam failure may be indicated respectively, or identification information of the cell may be directly indicated in response to that beam failure occurs on all TRPs of the cell.

In an optional implementation, the network device further configures a second reference signal resource set configured to discover candidate beams, to the terminal. A candidate beam corresponding to a reference signal is determined as a target candidate beam in response to that a radio link quality of the reference signal in the second reference signal resource set is greater than a threshold.

That is, the radio link quality of the reference signal corresponding to the target candidate beam is greater than the threshold, and the reference signal is the reference signal in the second reference signal resource set configured to discover the candidate beams. The radio link quality is represented by the L1-RSRP or the L1-SINR.

In this case, the first random access time-frequency resource is a random access time-frequency resource corresponding to the SSB corresponding to the target candidate beam.

For example, the SSB corresponding to the target candidate beam is a SSB sent by the first TRP or the second TRP. The terminal sends identification information in a physical uplink shared channel (PUSCH) of message A in a two-step random access procedure, in which the identification information is configured to indicate the first TRP; or, sends the identification information in the PUSCH of message 3 in a four-step random access procedure, in response to that the SSB corresponding to the target candidate beam is a SSB sent by the second TRP.

In step 508, the network device receives the first random access preamble on the first random access time-frequency resource.

The network device determines that a beam failure occurs in the terminal after receiving the first random access preamble sent by the terminal.

In step 510, the network device determines the first TRP.

The network device determines, according to the first SSB corresponding to the first random access time-frequency resource, that the beam failure occurs on the first TRP, in response to that the first random access time-frequency resource is the random access time-frequency resource of the first SSB.

There is a correspondence between the first SSB and the first TRP. For example, the first SSB is the reference signal resource corresponding to the TCI state of at least one CORESET corresponding to the CORESETpoolindex identifier corresponding to the first TRP. For another example, the first SSB corresponds to the first CSI-RS, and the random access time-frequency resource of the first SSB is determined as the first random access time-frequency resource. That is, the first CSI-RS is the reference signal resource corresponding to the TCI state of at least one CORESET corresponding to the CORESETpoolindex identifier corresponding to the first TRP. For another example, the network device directly indicates the first SSB corresponding to the first TRP, or directly indicates the first SSB corresponding to the CORESETpoolindex identifier corresponding to the first TRP.

In case that the first random access time-frequency resource is second SSB or the SSB sent by the other TRP, the network device also receives the identification information in the PUSCH of the message A in the two-step random access procedure, and determines the first TRP according to the identification information; or, the network device receives the identification information in the PUSCH of the message 3 in the four-step random access procedure, and determines the first TRP according to the identification information.

In an optional implementation, the network device further configures the second reference signal resource set configured to discover candidate beams, to the terminal. The network device determines the target candidate beam according to the SSB corresponding to the first random access time-frequency resource, in response to that the first random access time-frequency resource is the random access time-frequency resource corresponding to the SSB corresponding to the target candidate beam.

In step 512, the network device performs a beam failure recovery for the terminal for the first TRP.

The network device performs the beam failure recovery for the terminal according to the target candidate beam in response to that there is a target candidate beam reported by the terminal. For example, the target candidate beam is designated as the recovered beam. In response to that there is no target candidate beam reported by the terminal, the network device automatically designates a beam as the recovered beam, or the network device indicates the terminal to perform beam management measurement and reporting, and designates the recovered beam based on a reported result.

To sum up, in the method provided in the embodiment, in response to that the beam failure occurs on the first TRP, the terminal sends the first random access preamble by using the first random access time-frequency resource, and simultaneously indicates the first TRP by the first random access time-frequency resource or the identification information, so that the network device can accurately know that the beam failure occurs on the first TRP, and the network device can perform the beam failure recovery for the terminal for the first TRP.

Figures 7, 8:
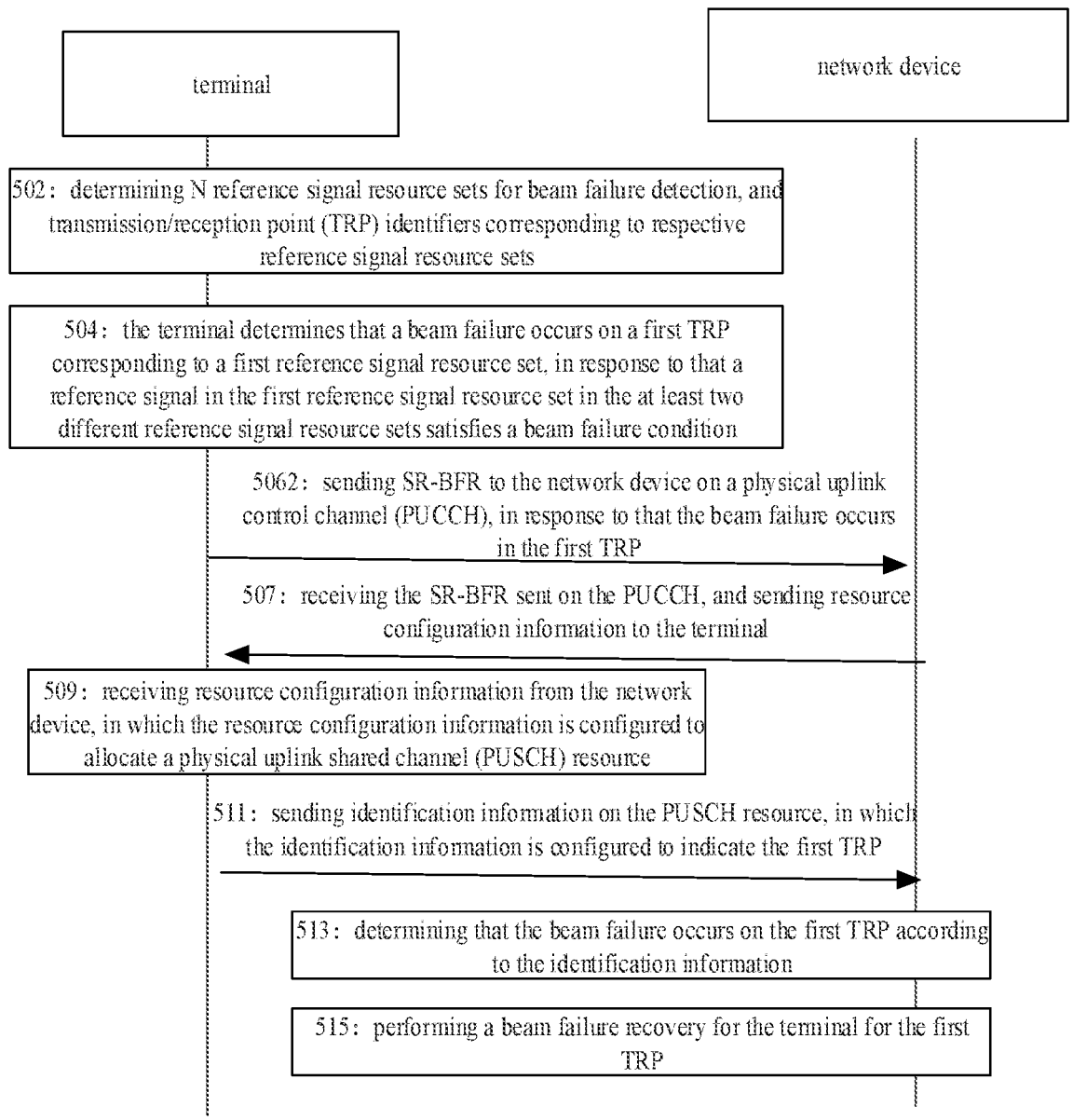
FIG. 7 is a flow chart showing a method for determining beam failure provided in an embodiment of the present disclosure.
FIG. 8 is a flow chart showing a method for determining beam failure provided in an embodiment of the present disclosure.

A second sending mode for the beam failure recovery request (SR-BFR):

FIG. 7 shows a flow chart showing a method for determining beam failure provided in an embodiment of the present disclosure. The method is applied to a terminal and a network device shown in FIG. 1 for illustration. The method includes following steps.

In step 502, the terminal determines N reference signal resource sets for beam failure detection, and transmission/reception point (TRP) identifiers corresponding to respective reference signal resource sets.

At least two different reference signal resource sets are included in the N reference signal resource sets, TRP identifiers corresponding to the at least two different reference signal resource sets are different, and physical cell identifiers corresponding to the at least two different reference signal resource sets are the same.

In step 504, the terminal determines that a beam failure occurs on a first TRP corresponding to a first reference signal resource set, in response to that at least one reference signal in the first reference signal resource set in the at least two different reference signal resource sets satisfies a beam failure condition.

In step 506-2, the terminal sends SR-BFR to the network device on a physical uplink control channel (PUCCH), in response to that the beam failure occurs on the first TRP.

The SR-BFR is a scheduling request (SR) for requesting beam failure recovery.

For example, the PUCCH is a PUCCH on a cell of a primary cell group; or, the PUCCH is a PUCCH on a cell of a secondary cell group; or, the PUCCH is a PUCCH on a cell of a neighboring cell; or, the PUCCH is a PUCCH sent on a third TRP, which has no beam failure and belongs to a same cell as the first TRP; or, the PUCCH is a PUCCH on a serving cell to which a non-first TRP without beam failure belongs.

In an example, the first TRP is a TRP on a Scell. The PUCCH is a PUCCH on a cell of a primary cell group; or, the PUCCH is a PUCCH on a cell of a secondary cell group; or, the PUCCH is a PUCCH sent on a fourth TRP, which has no beam failure and is on a Scell to which the first TRP belongs; or, the PUCCH is a PUCCH on another serving cell other than the Scell to which the first TRP belongs.

In an example, the first TRP is a TRP on a PCell or a PScell. The PUCCH is a PUCCH on a cell of a primary cell group; or, the PUCCH is a PUCCH on a cell of a secondary cell group; or, the PUCCH is a PUCCH sent on a fifth TRP, which is on the PCell or the PScell to which the first TRP belongs and has no beam failure; or, the PUCCH is a PUCCH on another serving cell other than the PScell or the PCell to which the first TRP belongs.

In an example, the first TRP is a TRP not configured with CORESET #0 of the terminal on a primary cell (PCell) or a primary secondary cell (PScell). The PUCCH is a PUCCH on a cell of a primary cell group; or, the PUCCH is a PUCCH on a cell of a secondary cell group; or, the PUCCH is a PUCCH sent on a sixth TRP, in which the sixth TRP is on the PCell or PScell to which the first TRP belongs and has no beam failure, and the sixth TRP includes a TRP configured with the CORESET #0 of the terminal or a TRP not configured with the CORESET #0 of the terminal; or, the PUCCH is a PUCCH on another serving cell other than the PScell or the PCell to which the first TRP belongs.

In an example, the first TRP is a TRP configured with CORESET #0 of the terminal on a primary cell (PCell) or a primary secondary cell (PScell). The PUCCH is a PUCCH on a cell of a primary cell group; or, the PUCCH is a PUCCH on a cell of a secondary cell group; or, the PUCCH is a PUCCH sent on a seventh TRP, in which the seventh TRP is on the PCell or PScell to which the first TRP belongs and has no beam failure, and the seventh TRP includes a TRP not configured with the CORESET #0 of the terminal; or, the PUCCH is a PUCCH on another serving cell other than the PScell or the PCell to which the first TRP belongs.

In an example, the first TRP is a TRP on a neighboring cell. The PUCCH is a PUCCH on a cell of a primary cell group; or, the PUCCH is a PUCCH on a cell of a secondary cell group; or, the PUCCH is a PUCCH on a cell of a neighboring cell.

In the above-mentioned embodiment, the step 506-2 is a method for sending the SR-BFR on the PUCCH in response to the beam failure provided by the embodiment of the present disclosure. The step 506-2 may be performed alone, or in combination with any one of steps in the present disclosure.

In step 507, the network device receives the SR-BFR sent on the PUCCH, and sends resource configuration information to the terminal.

The network device determines that there is a beam failure occurs on the TRP after receiving the SR-BFR.

The network device generates the resource configuration information for scheduling PUSCH resources. Optionally, the resource configuration information is included in uplink (UL) grant scheduling information, and the UL grant scheduling information is responded by the network device based on the SR-BFR.

The network device sends the UL grant scheduling information to the terminal. The UL grant scheduling information may be abbreviated as UL grant.

In step 509, the terminal receives resource configuration information from the network device, in which the resource configuration information is configured to allocate physical uplink shared channel (PUSCH) resources.

The terminal receives the UL grant scheduling information sent by the network device, and determines the scheduled PUSCH resource from the UL grant.

In step 511, the terminal sends identification information on the PUSCH resource, where the identification information is configured to indicate the first TRP.

The terminal sends a media access control control element (MAC CE) on the PUSCH resource, in which the MAC CE includes identification information, and the identification information is configured to indicate the first TRP.

For example, the identification information includes at least one of:
  a CORESET index identifier corresponding to the first TRP;
  a reference signal resource set index or at least one reference signal resource index corresponding to the first TRP;
  an identifier of the first TRP; or
  a cell identifier of the first TRP.

For example, the reference signal resources include at least one of: a SSB, a CSI-RS, a PRS, a TRS, and a SRS.

In some embodiments, the first TRP includes one or more TRPs, and identification information of each TRP of the first TRP needs to be indicated in response to that the first TRP includes multiple TRPs. The multiple TRPs may belong to different cells, or to the same cell. When multiple TRPs belong to the same cell, if the cell has TRPs that have no beam failure, identification information of the multiple TRPs that have beam failure will be indicated. The identification information of multiple TRPs that have beam failure may be indicated respectively, or identification information of the cell may be directly indicated, in response to that beam failure occurs on all TRPs of the cell.

In an optional implementation, the terminal is further configured with a second reference signal resource set configured to discover candidate beams. A candidate beam corresponding to a reference signal is determined as a target candidate beam, in response to that a radio link quality of the reference signal in the second reference signal resource set is greater than a threshold. That is, the radio link quality of the reference signal corresponding to the target candidate beam is greater than the threshold, and the reference signal is the reference signal in the second reference signal resource set configured to discover the candidate beams. The radio link quality is represented by the L1-RSRP or the L1-SINR.

At this time, the terminal also sends the reference signal identifier of the target candidate beam on the PUSCH resource. The radio link quality of the reference signal corresponding to the target candidate beam is greater than the threshold, and the reference signal is the reference signal in the second reference signal resource set configured to discover the candidate beams.

In step 513, the network device determines that the beam failure occurs on the first TRP according to the identification information;

The network device receives the identification information on the PUSCH resource, and determines that the beam failure occurs on the first TRP according to the identification information.

In step 515, the network device performs a beam failure recovery for the terminal for the first TRP.

The network device performs the beam failure recovery for the terminal according to the target candidate beam in response to that the PUSCH resource also includes the reference signal identifier of the target candidate beam reported by the terminal. For example, the target candidate beam is designated as the recovered beam. In response to that there is no target candidate beam reported by the terminal, the network device automatically designates a beam as the recovered beam, or the network device indicates the terminal to perform beam management measurement and reporting, and designates the recovered beam based on a reported result.

To sum up, in the method provided in the embodiment, in response to that the beam failure occurs on the first TRP, the terminal adopts the SR-BFR to indicate that the beam failure occurs, and simultaneously indicates the first TRP by the identification information sent on the PUSCH resource, so that the network device can accurately know that the beam failure occurs on the first TRP, and the network device can perform the beam failure recovery for the terminal for the first TRP.

FIG. 8 shows a flow chart showing a method for determining beam failure provided in an embodiment of the present disclosure. The method is applied to a network device, and the method includes step 802.

In step 802, configuration information is sent, in which the configuration information configures a terminal with at least one reference signal resource set in N reference signal resource sets for beam failure detection, and a transmission/reception point (TRP) identifier corresponding to each reference signal resource set in the at least one reference resource set At least two different reference signal resource sets are included in the N reference signal resource sets, TRP identifiers corresponding to the at least two different reference signal resource sets are different, and physical cell identifiers corresponding to the at least two different reference signal resource sets are the same.

In an example, the network device sends first configuration information to the terminal, in which the first configuration information is configured to configure the N reference signal resource sets.

In an example, the network device sends second configuration information to the terminal, in which the second configuration information is configured to configure a first part of reference signal resource sets in the N reference signal resource sets.

To sum up, in the method provided in the embodiment, by setting at least two reference signal resource sets for the terminal, in which the TRP identifiers corresponding to the at least two different reference signal resource sets are different, and the physical cell identifiers corresponding to the at least two different reference signal resource sets are the same, when a beam failure occurs on one TRP of multiple TRPS in the same service cell, the terminal can accurately determine the beam failure event of the TRP and then accurately report the beam failure determination to the base station, to avoid waste of communication resources.

Figure 9:
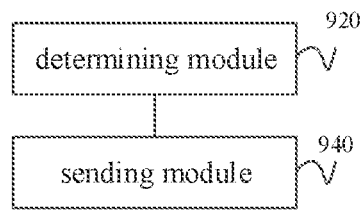
FIG. 9 is a block diagram showing an apparatus for determining beam failure provided in an embodiment of the present disclosure.

FIG. 9 shows a block diagram showing an apparatus for determining beam failure provided in an embodiment of the present disclosure. The apparatus can be implemented as a terminal, or implemented as a part of a terminal. The apparatus includes a determining module 920.

The determining module 920 is configured to determine N reference signal resource sets for beam failure detection, and transmission/reception point (TRP) identifiers corresponding to respective reference signal resource sets, in which at least two different reference signal resource sets are included in the N reference signal resource sets, TRP identifiers corresponding to the at least two different reference signal resource sets are different, and physical cell identifiers corresponding to the at least two different reference signal resource sets are the same.

In an optional implementation of the present disclosure, the TRP identifier includes a CORESET pool index, and the CORESET pool index is in one-to-one correspondence to the TRP; or, the TRP identifier includes a reference signal resource set index or at least one reference signal resource index, and the reference signal resource set index is in one-to-one correspondence to the TRP, or, the reference signal resource index is in one-to-one correspondence to the TRP; or, the TRP identifier includes a TRP number.

In an optional implementation of the present disclosure, the physical cell identifier includes a physical cell identifier of a serving cell and/or a neighboring cell of the terminal.

In an optional implementation of the present disclosure, the determining module 920 is configured to receive first configuration information from a network device, in which the first configuration information is configured to configure the N reference signal resource sets; or, the determining module 920 is configured to determine default N reference signal resource sets; or, the determining module 920 is configured to receive second configuration information from the network device, in which the second configuration information is configured to configure a first part of reference signal resource sets in the N reference signal resource sets; and determine a default second part of reference signal resource sets, in which the second part of reference signal resource sets are remaining sets of the N reference signal resource sets other than the first part of reference signal resource sets.

In an optional implementation of the present disclosure, for each TRP of the N TRPs, the default reference signal resource set is a reference signal resource set corresponding to a target transmission configuration indication (TCI) state, and the target TCI state is a TCI state configured for the terminal to monitor a physical downlink control channel (PDCCH) on a control resource set corresponding to the TRP.

In an optional implementation of the present disclosure, the determining module 920 is further configured to determine that a beam failure occurs on a first TRP corresponding to a first reference signal resource set, in response to that at least one reference signal in the first reference signal resource set in the at least two different reference signal resource sets satisfies a beam failure condition.

In an optional implementation of the present disclosure, the apparatus further includes a sending module 940. The sending module 940 is configured to send a beam failure recovery request to a network device in response to that the beam failure occurs on the first TRP.

In an optional implementation of the present disclosure, the sending module 940 is further configured to send a first random access preamble on a first random access time-frequency resource, in response to that the beam failure occurs on the first TRP, in which the first random access preamble is configured to indicate the beam failure recovery request.

In an optional implementation of the present disclosure, the sending module 940 is further configured to send the first random access preamble on the first random access time-frequency resource, in response to that the beam failure occurs on the first TRP and the first TRP is a TRP on a primary cell (PCell); or, send the first random access preamble on the first random access time-frequency resource, in response to that the beam failure occurs on the first TRP and the first TRP is a TRP on a primary secondary cell (PScell).

In an optional implementation of the present disclosure, the sending module 940 is further configured to send the first random access preamble on the first random access time-frequency resource, in response to that the beam failure occurs on the first TRP and the first TRP is a TRP configured with CORESET #0 of the terminal in a primary cell (PCell); or, send the first random access preamble on the first random access time-frequency resource, in response to that the beam failure occurs on the first TRP and the first TRP is a TRP configured with CORESET #0 of the terminal in a primary secondary cell (PScell).

In an optional implementation of the present disclosure, the first random access time-frequency resource is a random access time-frequency resource corresponding to a first synchronization signal block (SSB) sent by the first TRP. The first SSB is a reference signal resource corresponding to a TCI state of at least one CORESET corresponding to a CORESET pool index corresponding to the first TRP; or, the first SSB corresponds to a first channel state information reference signal (CSI-RS), and the first CSI-RS is a reference signal resource corresponding to a transmission configuration indication (TCI) state of at least one control resource set CORESET corresponding to a CORESET pool index corresponding to the first TRP.

In an optional implementation of the present disclosure, the first random access time-frequency resource is a random access time-frequency resource corresponding to a second SSB, and the second SSB is an SSB sent by the TRP configured with the CORESET #0.

In an optional implementation of the present disclosure, the first random access time-frequency resource is a random access time-frequency resource corresponding to the SSB corresponding to a target candidate beam; and
   a radio link quality of a reference signal corresponding to the target candidate beam is greater than a threshold, and the reference signal is a reference signal in a second reference signal resource set configured to discover candidate beams.

In an optional implementation of the present disclosure, the SSB corresponding to the target candidate beam is a SSB sent by the first TRP or the second TRP.

In an optional implementation of the present disclosure, the sending module 940 is further configured to send identification information in a physical uplink shared channel (PUSCH) of message A in a two-step random access procedure, in which the identification information is configured to indicate the first TRP; or, send the identification information in the PUSCH of message 3 in a four-step random access procedure.

In an optional implementation of the present disclosure, the sending module 940 is further configured to send SR-BFR to the network device on a physical uplink control channel (PUCCH), in response to that the beam failure occurs on the first TRP, in which the SR-BFR is a scheduling request (SR) for the beam failure recovery.

In an optional implementation of the present disclosure, the PUCCH is a PUCCH on a cell of a primary cell group; or, the PUCCH is a PUCCH on a cell of a secondary cell group; or, the PUCCH is a PUCCH on a neighboring cell; or, the PUCCH is a PUCCH sent on a third TRP, which has no beam failure and belongs to a same cell as the first TRP; or, the PUCCH is a PUCCH on a serving cell to which a non-first TRP without beam failure belongs.

In an optional implementation of present disclosure, the first TRP is a TRP on a secondary cell (Scell); the PUCCH is a PUCCH on a cell of a primary cell group; or, the PUCCH is a PUCCH on a cell of a secondary cell group; or, the PUCCH is a PUCCH sent on a fourth TRP, which has no beam failure and is on a Scell to which the first TRP belongs; or, the PUCCH is a PUCCH on another serving cell other than the Scell to which the first TRP belongs.

In an optional implementation of present disclosure, the first TRP is a TRP on a primary cell (PCell) or a primary secondary cell (PScell); the PUCCH is a PUCCH on a cell of a primary cell group; or, the PUCCH is a PUCCH on a cell of a secondary cell group; or, the PUCCH is a PUCCH sent on a fifth TRP, which is on the PCell or the PScell to which the first TRP belongs and has no beam failure; or, the PUCCH is a PUCCH on another serving cell other than the PScell or the PCell to which the first TRP belongs.

In an optional implementation of the present disclosure, the first TRP is a TRP not configured with CORESET #0 of the terminal on a primary cell (PCell) or a primary secondary cell (PScell). The PUCCH is a PUCCH on a cell of a primary cell group; or, the PUCCH is a PUCCH on a cell of a secondary cell group; or, the PUCCH is a PUCCH sent on a sixth TRP, in which the sixth TRP is on the PCell or PScell to which the first TRP belongs and has no beam failure, and the sixth TRP includes a TRP configured with the CORESET #0 of the terminal or a TRP not configured with the CORESET #0 of the terminal; or, the PUCCH is a PUCCH on another serving cell other than the PScell or the PCell to which the first TRP belongs.

In an optional implementation of the present disclosure, the first TRP is a TRP configured with CORESET #0 of the terminal on a primary cell (PCell) or a primary secondary cell (PScell). The PUCCH is a PUCCH on a cell of a primary cell group; or, the PUCCH is a PUCCH on a cell of a secondary cell group; or, the PUCCH is a PUCCH sent on a seventh TRP, in which the seventh TRP is on the PCell or PScell to which the first TRP belongs and has no beam failure, and the seventh TRP includes a TRP not configured with the CORESET #0 of the terminal; or, the PUCCH is a PUCCH on another serving cell other than the PScell or the PCell to which the first TRP belongs.

In an optional implementation of the present disclosure, the first TRP is a TRP on a neighboring cell; the PUCCH is a PUCCH on a cell of a primary cell group; or, the PUCCH is a PUCCH on a cell of a secondary cell group; or, the PUCCH is a PUCCH on a neighboring cell.

In an optional implementation of the present disclosure, the apparatus further includes a receiving module 960, and a sending module 940.

The receiving module 960 is configured to receive resource configuration information from the network device, in which the resource configuration information is configured to allocate a physical uplink shared channel (PUSCH) resource.

The sending module 940 is configured to send identification information on the PUSCH resource, in which the identification information is configured to indicate the first TRP.

In an optional implementation of the present disclosure, the resource configuration information is included in an uplink (UL) grant, and the UL grant is responded by the network device based on the SR-BFR.

In an optional implementation of the present disclosure, the sending module 940 is configured to send a media access control control element (MAC CE) on the PUSCH resource, in which the MAC CE includes identification information, and the identification information is configured to indicate the first TRP.

In an optional implementation of the present disclosure, the identification information includes at least one of:
- a CORESET index identifier corresponding to the first TRP;
- a reference signal resource set index or at least one reference signal resource index corresponding to the first TRP;
- an identifier of the first TRP; or
- a cell identifier of the first TRP.

In an optional implementation of the present disclosure, the sending module 940 is further configured to send a reference signal identifier of a target candidate beam on the PUSCH resource, in which a radio link quality of a reference signal corresponding to the target candidate beam is greater than a threshold, and the reference signal is a reference signal in the second reference signal resource set configured to discover candidate beams.

Figure 10:
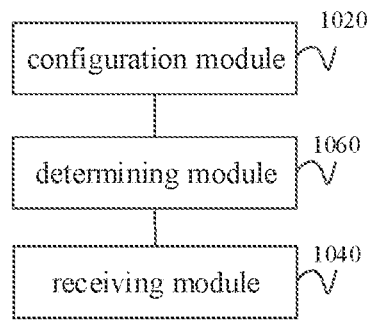
FIG. 10 is a block diagram showing an apparatus for determining beam failure provided in an embodiment of the present disclosure.

FIG. 10 shows a block diagram showing an apparatus for determining beam failure provided in an embodiment of the present disclosure. The apparatus can be implemented as a network device, or a part of a network device. The apparatus includes a configuration module 1020.

The configuration module 1020 is configured to send configuration information, in which the configuration information configures a terminal with at least one reference signal resource set in N reference signal resource sets for beam failure detection, and a transmission/reception point (TRP) identifier corresponding to each reference signal resource set in the at least one reference resource set;
 in which at least two different reference signal resource sets are included in the N reference signal resource sets, TRP identifiers corresponding to the at least two different reference signal resource sets are different, and physical cell identifiers corresponding to the at least two different reference signal resource sets are the same.

In an optional implementation of the present disclosure, the configuration module 1020 is configured to send first configuration information, in which the first configuration information is configured to configure the N reference signal resource sets; or, the configuration module 1020 is configured to send second configuration information, in which the second configuration information is configured to configure a first part of reference signal resource sets in the N reference signal resource sets.

In an optional implementation of the present disclosure, the apparatus further includes a receiving module 1040.

The receiving module 1040 is configured to receive a beam failure recovery request sent by the terminal, in which the beam failure recovery request is sent by the terminal in response to that beam failure occurs on the first TRP.

In an optional implementation of the present disclosure, the receiving module 1040 is configured to receive a first random access preamble on a first random access time-frequency resource, in which the first random access preamble is configured to indicate the beam failure recovery request.

In an optional implementation of the present disclosure, the apparatus further includes a determining module 1060.

The determining module 1060 is configured to determine that the beam failure occurs on the first TRP according to a first synchronization signal block (SSB) corresponding to the first random access time-frequency resource;
 in which the first SSB is a reference signal resource corresponding to a transmission configuration indication (TCI) state of at least one control resource set (CORESET) corresponding to a CORESET pool index corresponding to the first TRP; or, the first SSB corresponds to a first channel state information reference signal (CSI-RS), and the first CSI-RS is a reference signal resource corresponding to a TCI state of at least one CORESET corresponding to a CORESET pool index corresponding to the first TRP.

In an optional implementation of the present disclosure, the receiving module 1040 is configured to receive identification information in a physical uplink shared channel (PUSCH) of message A in a two-step random access procedure, and determine that the beam failure occurs on the first TRP according to the identification information or, the receiving module 1040 is configured to receive the identification information in a PUSCH of message 3 in a four-step random access procedure, and determine that the beam failure occurs on the first TRP according to the identification information.

In an optional implementation of the present disclosure, the receiving module 1040 is configured to receive SR-BFR sent on a physical uplink control channel (PUCCH), in which the SR-BFR is an SR for requesting beam failure recovery.

In an optional implementation of the present disclosure, the PUCCH is a PUCCH on a cell of a primary cell group; or, the PUCCH is a PUCCH on a cell of a secondary cell group; or, the PUCCH is a PUCCH on a cell of a neighboring cell; or, the PUCCH is a PUCCH sent on a third TRP, which belongs to a same cell as the first TRP and has no beam failure; or, the PUCCH is a PUCCH on a serving cell to which a non-first TRP without beam failure belongs.

In an optional implementation of present disclosure, the first TRP is a TRP on a secondary cell (Scell); the PUCCH is a PUCCH on a cell of a primary cell group; or, the PUCCH is a PUCCH on a cell of a secondary cell group; or, the PUCCH is a PUCCH sent on a fourth TRP, which is on the Scell to which the first TRP belongs and has no beam failure; or, the PUCCH is a PUCCH on another serving cell other than the Scell to which the first TRP belongs.

In an optional implementation of present disclosure, the first TRP is a TRP on a primary cell (PCell) or a primary secondary cell (PScell); the PUCCH is a PUCCH on a cell of a primary cell group; or, the PUCCH is a PUCCH on a cell of a secondary cell group; or, the PUCCH is a PUCCH sent on a fifth TRP, which is on the PCell or the PScell to which the first TRP belongs and has no beam failure; or, the PUCCH is a PUCCH on another serving cell other than the PScell or the PCell to which the first TRP belongs.

In an optional implementation of the present disclosure, the first TRP is a TRP not configured with CORESET #0 of the terminal on a primary cell (PCell) or a primary secondary cell (PScell). The PUCCH is a PUCCH on a cell of a primary cell group; or, the PUCCH is a PUCCH on a cell of a secondary cell group; or, the PUCCH is a PUCCH sent on a sixth TRP, in which the sixth TRP is on the PCell or PScell to which the first TRP belongs and has no beam failure, and the sixth TRP includes a TRP configured with the CORESET #0 of the terminal or a TRP not configured with the CORESET #0 of the terminal; or, the PUCCH is a PUCCH on another serving cell other than the PScell or the PCell to which the first TRP belongs.

In an optional implementation of the present disclosure, the first TRP is a TRP configured with CORESET #0 of the terminal on a primary cell (PCell) or a primary secondary cell (PScell). The PUCCH is a PUCCH on a cell of a primary cell group; or, the PUCCH is a PUCCH on a cell of a secondary cell group; or, the PUCCH is a PUCCH sent on a seventh TRP, in which the seventh TRP is on the PCell or PScell to which the first TRP belongs and has no beam failure, and the seventh TRP includes a TRP not configured with the CORESET #0 of the terminal; or, the PUCCH is a PUCCH on another serving cell other than the PScell or the PCell to which the first TRP belong.

In an optional implementation of the present disclosure, the first TRP is a TRP on a neighboring cell; the PUCCH is a PUCCH on a cell of a primary cell group; or, the PUCCH is a PUCCH on a cell of a secondary cell group; or, the PUCCH is a PUCCH on a neighboring cell.

In an optional implementation of the present disclosure, the configuration module 1020 is configured to send resource configuration information to the terminal, in which the resource configuration information is configured to allocate a physical uplink shared channel (PUSCH) resource. The receiving module 1040 is configured to receive identification information on the PUSCH resource. The determining module 1060 is configured to determine that the beam failure occurs on the first TRP according to the identification information.

In an optional implementation of the present disclosure, the resource configuration information is included in an uplink (UL) grant, and the UL grant is responded by the network device based on the SR-BFR.

In an optional implementation of the present disclosure, the receiving module 1040 is configured to receive a media access control control element (MAC CE) on the PUSCH resource, in which the MAC CE includes the identification information.

In an optional implementation of the present disclosure, the identification information includes at least one of:
- a CORESET pool index corresponding to the first TRP;
- a reference signal resource set index or at least one reference signal resource index corresponding to the first TRP;
- an identifier of the first TRP; or
- a cell identifier of the first TRP.

Figure 11:
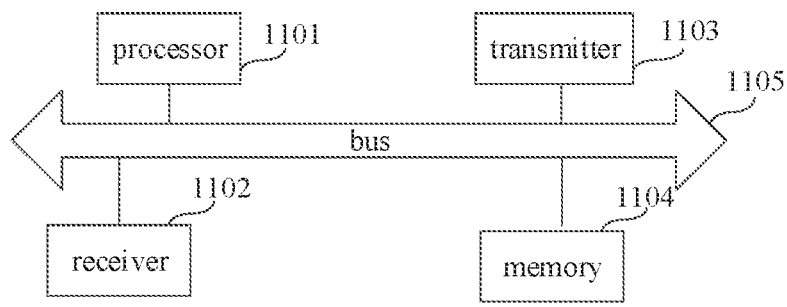
FIG. 11 is a block diagram showing a terminal provided in an embodiment of the present disclosure.

FIG. 11 shows a schematic structural diagram showing a terminal provided in an embodiment of the present disclosure. The terminal includes a processor 1101, a receiver 1102, a transmitter 1103, a memory 1104, and a bus 1105.

The processor 1101 includes one or more processing cores, and the processor 1101 executes various functional applications and information processing by running software programs and modules.

The receiver 1102 and the transmitter 1103 may be implemented as a communication component, which may be a communication chip.

The memory 1104 is connected with the processor 1101 via the bus 1105.

The memory 1104 may be configured to store at least one instruction, and the processor 1101 may be configured to execute the at least one instruction to implement various steps in the above-mentioned method embodiments.

Additionally, the memory 1104 may be implemented using type of volatile or non-volatile memory devices, or a combination thereof. The volatile or non-volatile memory devices include, but are not limited to, a magnetic or optical disk, an electrically erasable programmable read-only memory (EEPROM), an erasable programmable read-only memory (EPROM), a static random access memory (SRAM), a read-only memory (ROM), a magnetic memory, a flash memory, and a programmable read-only memory (PROM).

In an embodiment, there is also provided a computer-readable storage medium having stores therein at least one instruction, at least one piece of program, a code set, or an instruction set that, when loaded and executed by a processor, causes the method for determining beam failure executed by a terminal provided by each of the above-mentioned method embodiments to be implemented.

Figure 12:
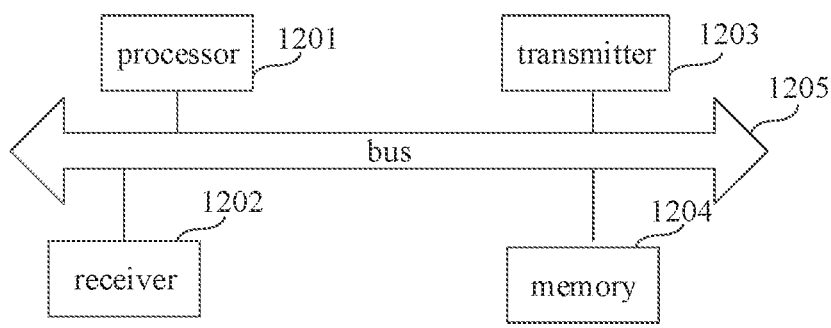
FIG. 12 is a block diagram showing a network device provided in an embodiment of the present disclosure.

FIG. 12 shows a schematic structural diagram showing a network device provided in an embodiment of the present disclosure. The network device includes a processor 1201, a receiver 1202, a transmitter 1203, a memory 1204, and a bus 1205.

The processor 1201 includes one or more processing cores, and the processor 1201 executes various functional applications and information processing by running software programs and modules.

The receiver 1202 and the transmitter 1203 may be implemented as a communication component, which may be a communication chip.

The memory 1204 is connected with the processor 1201 via the bus 1205.

The memory 1204 may be configured to store at least one instruction, and the processor 1201 may be configured to execute the at least one instruction to implement various steps in the above-mentioned method embodiments.

Additionally, the memory 1204 may be implemented using any type of volatile or non-volatile memory devices, or a combination thereof. The volatile or non-volatile memory devices include, but are not limited to, a magnetic or optical disk, an electrically erasable programmable read-only memory (EEPROM), an erasable programmable read-only memory (EPROM), a static random access memory (SRAM), a read-only memory (ROM), a magnetic memory, a flash memory, and a programmable read-only memory (PROM).

In an embodiment, there is also provided a computer-readable storage medium having stores therein at least one instruction, at least one piece of program, a code set, or an instruction set that, when loaded and executed by a processor, causes the method for determining beam failure provided by each of the above-mentioned method embodiments to be implemented.

Those skilled in the art will appreciate that all or part of the steps for implementing the above-mentioned embodiments may be performed by hardware, or may be performed by a program that instructs the relevant hardware. The program may be stored on a computer-readable storage medium, such as a read-only memory, a magnetic or optical disk, etc.

The above descriptions are only example embodiments of the present disclosure, and are not intended to limit the present disclosure. Any modifications, equivalent replacements, improvements, etc. made within the spirit and principles of the present disclosure shall be included in the scope of protection of the present disclosure.

What is claimed is:

1. A method for determining beam failure, applied to performed by a terminal, comprising:
    determining N reference signal resource sets for beam failure detection, and transmission/reception point (TRP) identifiers corresponding to respective reference signal resource sets, wherein at least two different reference signal resource sets are included in the N reference signal resource sets, TRP identifiers corresponding to the at least two different reference signal resource sets are different, and physical cell identifiers corresponding to the at least two different reference signal resource sets are the same.

2. The method of claim 1, wherein,
    a TRP identifier comprises a CORESET control resource set (CORESET) pool index corresponding to a TRP;
    or,
    a TRP identifier comprises a reference signal resource set index or at least one reference signal resource index corresponding to a TRP;
    or,
    a TRP identifier comprises a TRP number;
    wherein a physical cell identifier comprises: a physical cell identifier of a serving cell and/or a neighboring cell of the terminal.

3. The method of claim 1, wherein determining the N reference signal resource sets for the beam failure detection comprises:
    receiving first configuration information from a network device, wherein the first configuration information is configured to configure the N reference signal resource sets;
    or,
    determining default N reference signal resource sets;
    or,
    receiving second configuration information from a network device, wherein the second configuration information is configured to configure a first part of reference signal resource sets in the N reference signal resource sets; and determining a default second part of reference signal resource sets, wherein the second part of reference signal resource sets are remaining sets of the N reference signal resource sets other than the first part of reference signal resource sets;
    wherein for each TRP of the N TRPs, the default reference signal resource set is a reference signal resource set corresponding to a target transmission configuration indication (TCI) state, and the target TCI state is a TCI state configured for the terminal to monitor a physical downlink control channel (PDCCH) on a control resource set corresponding to the TRP.

4. The method of claim 1, further comprising:
    determining that a beam failure occurs on a first TRP corresponding to a first reference signal resource set, in response to that at least one reference signal in the first reference signal resource set in the at least two different reference signal resource sets satisfies a beam failure condition.

5. The method of claim 4, further comprising:
    sending a beam failure recovery request to a network device in response to that the beam failure occurs on the first TRP.

6. The method of claim 5, wherein sending the beam failure recovery request to the network device in response to that the beam failure occurs on the first TRP comprises:
    sending a first random access preamble on a first random access time-frequency resource, in response to that the beam failure occurs on the first TRP, wherein the first random access preamble is configured to indicate the beam failure recovery request.

7. The method of claim 6, wherein sending the first random access preamble on the first random access time-frequency resource, in response to that the beam failure occurs on the first TRP, comprises:
    sending the first random access preamble on the first random access time-frequency resource, in response to that the beam failure occurs on the first TRP and the first TRP is a TRP on a primary cell (PCell);
    or,
    sending the first random access preamble on the first random access time-frequency resource, in response to that the beam failure occurs on the first TRP and the first TRP is a TRP on a primary secondary cell (PScell).

8. The method of claim 7, wherein the first random access time-frequency resource is a random access time-frequency resource corresponding to a first synchronization signal block (SSB) sent by the first TRP,
    wherein,
    the first SSB is a reference signal resource corresponding to a transmission configuration indication (TCI) state of at least one CORESET corresponding to a CORESET pool index corresponding to the first TRP;
    or,
    the first SSB corresponds to a first channel state information reference signal (CSI-RS), and the first CSI-RS is a reference signal resource corresponding to a transmission configuration indication (TCI) state of at least one control resource set CORESET corresponding to a CORESET pool index corresponding to the first TRP.

9. The method of claim 7, wherein the first random access time-frequency resource corresponds to a second SSB, and the second SSB is an SSB sent by a TRP configured with the CORESET #0 of the terminal.

10. The method of claim 7, wherein the first random access time-frequency resource corresponds to a SSB corresponding to a target candidate beam; and
    a radio link quality of a reference signal corresponding to the target candidate beam is greater than a threshold, and the reference signal is in a second reference signal resource set configured to discover candidate beams,
    wherein the SSB corresponding to the target candidate beam is sent by the first TRP or the second TRP.

11. The method of claim 9, further comprising:
    sending identification information in a physical uplink shared channel (PUSCH) of message A in a two-step random access procedure, wherein the identification information is configured to indicate the first TRP;
    or,
    sending identification information in a PUSCH of message 3 in a four-step random access procedure.

12. The method of claim 6, wherein sending the first random access preamble on the first random access time-frequency resource in response to that the beam failure occurs on the first TRP comprises:
    sending the first random access preamble on the first random access time-frequency resource, in response to that the beam failure occurs on the first TRP and the first TRP is a TRP configured with CORESET #0 of the terminal in a primary cell (PCell);
    or,
    sending the first random access preamble on the first random access time-frequency resource, in response to that the beam failure occurs on the first TRP and the first TRP is a TRP configured with CORESET #0 of the terminal in a primary secondary cell (PScell).

13. The method of claim 5, wherein sending the beam failure recovery request to the network device in response to that the beam failure occurs on the first TRP comprises:
sending SR-BFR to the network device in a physical uplink control channel (PUCCH), in response to that the beam failure occurs on the first TRP, wherein the SR-BFR is a scheduling request (SR) for requesting beam failure recovery.

14. The method of claim 13, wherein,
the PUCCH is a PUCCH on a cell of a primary cell group;
or,
the PUCCH is a PUCCH on a cell of a secondary cell group;
or,
the PUCCH is a PUCCH on a neighboring cell;
or,
the PUCCH is a PUCCH sent on a third TRP, which has no beam failure and belongs to a same cell as the first TRP;
or,
the PUCCH is a PUCCH on a serving cell to which a non-first TRP without beam failure belongs,
or,
wherein the first TRP is a TRP on a secondary cell (Scell);
the PUCCH is a PUCCH on a cell of a primary cell group;
or,
the PUCCH is a PUCCH on a cell of a secondary cell group;
or,
the PUCCH is a PUCCH sent on a fourth TRP, which has no beam failure and is on a Scell to which the first TRP belongs;
or,
the PUCCH is a PUCCH on another serving cell other than the Scell to which the first TRP belongs,
or,
wherein the first TRP is a TRP on a primary cell (PCell) or a primary secondary cell (PScell);
the PUCCH is a PUCCH on a cell of a primary cell group;
or,
the PUCCH is a PUCCH on a cell of a secondary cell group;
or,
the PUCCH is a PUCCH sent on a fifth TRP, which is on the PCell or the PScell to which the first TRP belongs and has no beam failure;
or,
the PUCCH is a PUCCH on another serving cell other than the PScell or the PCell to which the first TRP belongs,
or,
wherein the first TRP is a TRP not configured with CORESET #0 of the terminal on a primary cell (PCell) or a primary secondary cell (PScell);
the PUCCH is a PUCCH on a cell of a primary cell group;
or,
the PUCCH is a PUCCH on a cell of a secondary cell group;
or,
the PUCCH is a PUCCH sent on a sixth TRP, in which the sixth TRP is on the PCell or PScell to which the first TRP belongs and has no beam failure, and the sixth TRP comprises a TRP configured with the CORESET #0 of the terminal or a TRP not configured with the CORESET #0 of the terminal,
or,
wherein the first TRP is a TRP configured with CORESET #0 of the terminal on a primary cell (PCell) or a primary secondary cell (PScell);
the PUCCH is a PUCCH on a cell of a primary cell group;
or,
the PUCCH is a PUCCH on a cell of a secondary cell group;
or,
the PUCCH is a PUCCH sent on a seventh TRP, in which the seventh TRP is on the PCell or PScell to which the first TRP belongs and has no beam failure, and the seventh TRP comprises a TRP not configured with the CORESET #0 of the terminal,
or,
wherein the first TRP is a TRP on a neighboring cell;
the PUCCH is a PUCCH on a cell of a primary cell group;
or,
the PUCCH is a PUCCH on a cell of a secondary cell group;
or,
the PUCCH is a PUCCH on a neighboring cell.

15. The method of claim 13, further comprising:
receiving resource configuration information from the network device, wherein the resource configuration information is configured to allocate a physical uplink shared channel (PUSCH) resource; and
sending identification information on the PUSCH resource, wherein the identification information is configured to indicate the first TRP,
wherein the resource configuration information is included in an uplink (UL) grant, and the UL grant is responded by the network device based on the SR-BFR,
wherein sending the identification information on the PUSCH resources, wherein the identification information is configured to indicate the first TRP, comprises:
sending a media access control control element (MAC CE) on the PUSCH resource, wherein the MAC CE includes identification information, and the identification information is configured to indicate the first TRP.

16. The method of claim 13, wherein the identification information comprises at least one of:
a CORESET pool index corresponding to the first TRP;
a reference signal resource set index or at least one reference signal resource index corresponding to the first TRP;
an identifier of the first TRP; or
a cell identifier of the first TRP.

17. The method of claim 13, further comprising:
sending a reference signal identifier of a target candidate beam on the PUSCH resource, wherein a radio link quality of a reference signal corresponding to the target candidate beam is greater than a threshold, and the reference signal is a reference signal in the second reference signal resource set configured to discover candidate beams.

18. A method for determining beam failure, performed by a network device, comprising:
sending configuration information, wherein the configuration information configures a terminal with at least one reference signal resource set in N reference signal resource sets for beam failure detection, and a transmission/reception point (TRP) identifier corresponding to each reference signal resource set in the at least one reference resource set;

wherein at least two different reference signal resource sets are included in the N reference signal resource sets, TRP identifiers corresponding to the at least two different reference signal resource sets are different, and physical cell identifiers corresponding to the at least two different reference signal resource sets are the same.

19. A terminal, comprising:
a processor;
a transceiver connected to the processor; and
a memory for storing executable instructions of the processor;
wherein the processor is configured to:
determine N reference signal resource sets for beam failure detection, and transmission/reception point (TRP) identifiers corresponding to respective reference signal resource sets, wherein at least two different reference signal resource sets are included in the N reference signal resource sets, TRP identifiers corresponding to the at least two different reference signal resource sets are different, and physical cell identifiers corresponding to the at least two different reference signal resource sets are the same.

20. A network device, comprising:
a processor;
a transceiver connected to the processor; and
a memory for storing executable instructions of the processor;
wherein the processor is configured to:
send configuration information, wherein the configuration information configures a terminal with at least one reference signal resource set in N reference signal resource sets for beam failure detection, and a transmission/reception point (TRP) identifier corresponding to each reference signal resource set in the at least one reference resource set;
wherein at least two different reference signal resource sets are included in the N reference signal resource sets, TRP identifiers corresponding to the at least two different reference signal resource sets are different, and physical cell identifiers corresponding to the at least two different reference signal resource sets are the same.

* * * * *